(12) United States Patent
Berger et al.

(10) Patent No.: US 6,990,360 B2
(45) Date of Patent: Jan. 24, 2006

(54) PATTERN DETECTION USING THE BRAGG EFFECT AT RF FREQUENCIES

(75) Inventors: Henry Berger, Alexandria, VA (US); Edmundo Simental, Alexandria, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 801 days.

(21) Appl. No.: 09/985,312

(22) Filed: Nov. 2, 2001

(65) Prior Publication Data

US 2002/0107048 A1  Aug. 8, 2002

Related U.S. Application Data

(60) Provisional application No. 60/245,151, filed on Nov. 3, 2000.

(51) Int. Cl.
*H04M 1/00* (2006.01)

(52) U.S. Cl. .................. 455/562.1; 455/11.1; 455/403

(58) Field of Classification Search ............. 455/403, 455/500, 67.11, 562.1, 11.1; 342/176, 357.01, 342/357.08, 357.12
See application file for complete search history.

(56) References Cited

U.S. PATENT DOCUMENTS

| | | | |
|---|---|---|---|
| 4,888,593 A | * | 12/1989 | Friedman et al. ........... 342/375 |
| 4,961,181 A | | 10/1990 | Elliott |
| 4,970,701 A | | 11/1990 | Kirkland |
| 4,993,325 A | | 2/1991 | Slone, Jr. et al. |
| 5,277,117 A | | 1/1994 | Bender et al. |
| 5,353,324 A | | 10/1994 | Kitano |
| 5,469,168 A | * | 11/1995 | Anderson ................. 342/26 D |
| 5,598,152 A | | 1/1997 | Scarzello et al. |
| 6,269,144 B1 | | 7/2001 | Dube et al. |

* cited by examiner

Primary Examiner—Sonny Trinh
Assistant Examiner—Sam Bhattacharya
(74) Attorney, Agent, or Firm—Earl H. Baugher, Jr.

(57) ABSTRACT

A system, and method of its use, provides for detecting patterns that exist within a geographic area due to the presence of an orderly array of objects. In a preferred embodiment, the system uses an irregular array of transceivers to illuminate an area suspected of containing a minefield. Typically, these minefields are arranged in an orderly arrangement. Exploiting the Bragg Effect, the transceivers, each configured as a surface wave radar, illuminate an area with RF energy that is scanned in carrier frequency within the HF band (3–30 MHz) at a pre-specified interval. At the frequency that corresponds to the Bragg Effect, a significantly increased signal level occurs that indicates the presence of a pattern such as one might expect from reflections from numerous objects arranged orderly. By processing these returns judiciously, the minefield's size, location, perimeter, and even the location of individual mines may be determined.

24 Claims, No Drawings

PATTERN DETECTION USING THE BRAGG EFFECT AT RF FREQUENCIES

RELATED APPLICATIONS

Under 35 U.S.C § 119(e)(1), this application claims the benefit of prior co-pending U.S. Provisional Patent Application Ser. No. 60/245,151, "Remote Detection of Minefields," by Berger et al., filed Nov. 3, 2000, incorporated herein by reference.

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest therein of any patent granted thereon by the United States. This patent and related ones are available for licensing. Contact Phillip Stewart at 601 634-4113.

FIELD OF THE INVENTION

The field of the invention is pattern detection by exploiting the Bragg Effect. In particular, a preferred embodiment of the present invention employs surface wave radar to recognize patterns indicative of minefields.

BACKGROUND

Often minefields are first detected by a mine detonation, resulting in casualties and equipment damage. This method of detection is unacceptable. Thus, when operating in potentially mined areas, expensive and time consuming precautions are undertaken.

Once a minefield is identified, a variety of methods are used to locate individual mines therein. These range from the use of ground penetrating radar to manual detection by visual observation or probing with a pole. A disadvantage of conventional methods is the need to operate close to the mines, often within the minefield itself. This endangers personnel and equipment because of the potential to accidentally trigger a mine.

A preferred embodiment of the present invention provides a new method of recognizing patterns that lead to locating minefields and even detecting individual mines, in particular those designed to be detonated by the passing of vehicles. It makes use of some of the unusual properties of the reflections of electromagnetic waves traveling along the earth's surface, i.e., surface waves, and collectively reflecting off of the arrays of landmines in such minefields. In particular, it exploits the reflections from patterns of symmetric arrays of mines.

While there are different schemes by which landmines are spatially deployed in minefields, the periodic planar array is common. The planar array has the landmines at the intersections of a rectangular grid consisting of rows and columns of mines. In other configurations, the landmines are deployed so that on alternate rows (or columns) they are displaced laterally. These geometries and interactions are analogous to two-dimensional projections of crystal structures that have been shown to respond predictably when X-rayed.

Since these minefields are analogous to crystalline arrays they may be recognized as such when illuminated at appropriate radio frequency (RF) frequencies such as in the HF band. Much theory and applications have been developed on electromagnetic wave interactions with arrays of the above nature. A new journal, *Subsurface Sensing Technologies and Applications*, is devoted to the overall subject and many other references are available. Although the dimensions and frequencies discussed in this journal and related references vary greatly from a surface wave radar application of a preferred embodiment of the present invention, the discussion of the relationship of wavelength to dimension is equivalent. The theory of operation has been discussed in a paper entitled, "Remote Subsurface Minefield Detection and Recognition from Spectral Signatures," presented on Nov. 3, 1999.

SUMMARY

A preferred embodiment of the present invention exploits the Bragg Effect to detect or identify a pattern within a pre-specified geographic area. Major elements of the system include:

- an array of transceiver stations, each station incorporating appropriate antennas, a processor that communicates with the elements of the array, parts of which may be co-located at each or selected transceiver stations;
- a display that receives processed information from the processor and the individual stations, as appropriate; and
- an optional GPS system that could include GPS receivers and repeaters located at each station, and a central processor for manipulating the GPS data from the repeaters as well as from the GPS satellites themselves.

Each transceiver station illuminates a pre-specified geographic area with electromagnetic energy at a carrier frequency that may stimulate a Bragg resonance as a result of the carrier frequency being swept in frequency over a pre-specified band within a pre-specified time interval. The array of transceiver stations is located remote from the pre-specified geographic area. Should an orderly array of objects populate the pre-specified geographic area, the transceiver stations receive reflections of electromagnetic energy from the objects in the orderly array. The reflected energy from each object is coherent with that received from other objects when the object is illuminated at a carrier frequency that generates a Bragg resonance.

In effect, the array of transceiver stations emulates one "phased array" radar system, and is optimized when placed in an asymmetric configuration. In a preferred embodiment of the present invention, the system is optimized to recognize patterns that infer an ordered array of objects configured in a manner analogous to that of a minefield. In one embodiment, a transceiver station employ one antenna close to the surface of the earth so that it transmits electromagnetic energy at RF carrier frequencies as a surface wave.

In a preferred embodiment of the present invention, the system operates at RF carrier frequencies that lie in the HF band, i.e., from 3 MHz–30 MHz. The frequency of the illuminating signal is swept across at least a portion of this band over a pre-specified time interval consistent with the performance parameters of the processor.

Each station has an antenna appropriately configured to transmit a surface wave, i.e., one that travels in free space "hugging the surface," and to receive reflections from objects that may be buried up to several feet in the ground or beneath the surface of the water. Another antenna may be provided at each station for communications among the stations or with a central controller, or both. This antenna may be a GPS antenna in communication with a GPS receiver or even a satellite uplink or an antenna that may allow communication with combinations of such devices.

Alternatively, the concept of individual radar stations could be incorporated in a single radar system with at least one phased array antenna that is able to communicate with suitable processors and displays via an associated communications system.

The characteristics of the reflected signals that enable one to detect or identify an orderly array of objects are one or more of the following:

very weak reflected energy at some of the scanned frequencies and very strong reflected energy at others of the scanned frequencies;

at the Bragg resonance frequency, the relative amplitude of the reflected energy is very large when compared to the reflected energy not occurring at a Bragg resonance frequency;

the very weak reflected energy is distributed over a relatively large frequency band in comparison to the strong reflected energy;

the strong reflected energy occurs at the tops of very narrow high peaks in amplitude of the reflected energy;

a relatively large number of the narrow high peaks in amplitude of the reflected energy indicating that it is reflected at the Bragg resonance frequency;

reflected energy having a very narrow beamwidth indicating energy reflected at the Bragg resonance frequency;

a very large spatial width of the beam of the reflected energy indicating energy reflected at the Bragg resonant frequency;

the changing orientation of the reflected energy having the very narrow beamwidth indicating the resonance frequency changes as the carrier frequency is swept, as sensed by the antenna array of the transceiver stations;

the rotation rate of the surface of reflected energy descriptive of a frequency at the Bragg resonance is controlled by the rate at which the frequency is swept; and the peak values of reflected energy are spatially coherent.

Conservatively, at least three of the above characteristics are correlated to detect or identify the presence of a pattern. Further, upon detection or identification of a pattern of interest, the additional occurrence of one of the above list of characteristics may be used to determine an additional inherent parameter of the pattern, such as the size of an orderly array of objects that may represent the pattern, the perimeter of the orderly array, the relative location of individual objects within the orderly array, the number of objects within the orderly array, and combinations thereof. Of course, locating the orderly array represented by the detected pattern may be done by utilizing signals from a global positioning system (GPS) and appropriate GPS receivers.

A preferred embodiment of the present invention will provide one or more of the following capabilities from a remote location:

a method for detecting or identifying a pattern that may represent a user-specified target;

a system for detecting or identifying a pattern that may represent a user-specified target;

a method for locating the user-specified target;

a system for locating the user-specified target;

a method for identifying individual items that may be incorporated in the user-specified target; and a system for identifying individual items that may be incorporated in the user-specified target.

Further, a particular embodiment will provide the above capabilities when the user-specified target is a minefield of an ordered array of mines that may have at least some mines targeted for detonation by vehicles. Additionally, a preferred embodiment of the present invention will delineate the dimensions (perimeter) of the minefield.

DETAILED DESCRIPTION

One way to obtain very strong electromagnetic wave reflections from an array of landmines in a minefield is to "see" the minefield as a "monolith." This is accomplished by combining all the relatively weak reflections coherently into one relatively strong RF reflected signal. This is done by exciting the minefield at one of its "natural" Bragg frequencies and gathering the "collective reflection" at one or more receivers. The result is a single coherent mono-directional beam reflecting most of the energy illuminating the minefield. This section describes the effect of "collective excitation" and "collective reception" and a later section describes how it is accomplished.

The Bragg Effect is a phenomenon common to the electromagnetic wave excitation of arrays of objects such as crystal lattices or macroscopic structures incorporated in an array, such as minefields. These arrays may be initiated as small two-dimensional matrices having x columns and y rows that repeat themselves, i.e., they are periodic. By choosing a wavelength in relation to both the inter-object spacing, e.g., spacing between individual land mines, and the direction from which the array is viewed, e.g., from a helicopter overhead and displaced horizontally, a strong single coherent mono-directional beam of reflected energy may be obtained.

Applying the concept of a preferred embodiment of the present invention to a minefield configured as a planar array, both the inter-mine spacing, L, in the minefield and the orientation angle, $\theta$, of the minefield to an array of radar transceivers are initially unknown. This problem is overcome by sweeping the carrier frequency of the source illuminating the minefield. Thus, the carrier frequency, or equivalently the wavelength, $\lambda$, is varied with time between some fixed maximum and minimum values. In a preferred embodiment, the frequency is varied in the band between 3 mega-Hertz (MHz) and 30 MHz. However, depending on the size and location of the minefield, as well as local terrain, this frequency band can be adjusted to optimize results. Varying (sweeping) the frequency can be effective for two reasons. First, while L is not initially known, there is some reasonable approximation, at least to an order of magnitude, that usually is. Second, while $\theta$ is not initially known, in Bragg reflection, the effective plane of reflection will rotate in quantized steps as the frequency changes. Thus, frequency sweeping an RF signal of appropriate wavelengths over a minefield produces a reflection at the Bragg frequency of the minefield oriented toward the array of radar receivers.

The energy in the reflected beam can be estimated. If the transmission media were lossless, the on-axis-reflected power of an orderly array of 100 by 100 landmines fitting in the scanning beamwidth of the illuminating radar would be 40 dB or a factor of 10,000 over that of an individual landmine.

Even in a lossy medium, the expression for an orderly antenna array pattern is well known in the art. See, for example, M. T. Ma, *Antenna Engineering Handbook*, Chapter 3, "Arrays of Discrete Elements," edited by R. Johnson, McGraw-Hill, 1993. The on-axis maximum value is determined similarly to that in a non-lossy medium, i.e., using a factor proportional to N times M. Off-axis, attenuation plays a significant role. With the Bragg Effect, the effective surface of reflection rotates as the carrier frequency of the illuminating source varies. For large orderly arrays, such as a minefield, the effective surface of reflection can be arranged to coincide with the axis of the receive antenna arrays by correct choice of frequency so that the receive antenna array is never far off-axis, and thus sees nearly the full gain of the array minus any losses at a given time.

A strong reflection is not indicative per se of a Bragg Effect reflection from a minefield. To recognize that a minefield is being illuminated requires analysis of definitive characteristics. The spectral signature of an orderly arrayed minefield provides this.

There are at least ten discriminants that lead to identifying orderly arrays of landmines. Resonance phenomena of this type have been studied for almost a century, and there may be other characteristics that could be added. Such characteristics, when considered in toto, are not produced by other phenomena, e.g., non-orderly arrays or isolated single objects. These ten are:

Very weak reflections exist at some frequencies and strong reflections at others.

At resonance (i.e., Bragg Effect) frequencies the relative amplitude of the reflected beam is very large.

The weak reflections are over relatively large frequency bands in comparison to the strong reflections.

The strong reflections occur at the tops of very narrow high peaks in the reflection amplitudes. Thus, there will be extreme frequency sensitivity in amplitude near the Bragg Effect resonances.

For a minefield of even moderate size there are a large number of such narrow peaks in reflection amplitude. For a large minefield the number of peaks is enormous.

The reflected beam is almost mono-directional, i.e. it has a very narrow beamwidth. Note that beamwidth of a reflected signal is defined as a measure of the beam's spread in angle at a given point, such as at the 3 dB roll-off, and not its actual spatial width.

Even for minefields of moderate size the spatial width of the mono-directional Bragg Effect reflected beam is very large.

As the frequency sweeps, the direction of the mono-directional reflected Bragg Effect beam changes and the array of antennas senses this.

The rotation rate of the Bragg Effect surface of reflection is controlled by the rate at which the frequency is swept.

The peak reflections are spatially coherent, as may be determined by individual phase measurements at each of the stations.

Further, the above discriminants may be used to estimate some of the spatial characteristics of a minefield, such as:

the size of the minefield as derived from the number of peaks in reflection amplitude;

the dimensions of the minefield as derived from the spatial width of the mono-directional reflected beam; and the number of landmines in the minefield as derived from the quantization in rotation angle.

Losses of conventional radar in penetrating the air to ground interface are quite large. A preferred embodiment of this invention avoids these types of loss by employing a phased radar array comprising numerous radar transceivers remotely inserted in the earth's surface (e.g., dropped from an aircraft). These transceivers transmit surface waves traveling outward in well defined directions and remaining very close to the surface of the ground. These "surface waves" reflect from any landmines in the vicinity. One embodiment uses conventional surface wave antennas and communications antennas above the surface to enable an autonomous station that performs a number of functions.

Thus, a set of antenna stations radiating in coordination constitutes a phased array antenna just above the plane of the earth's surface. Each antenna station may include the necessary antennas, processors, transmitters, and receivers for:

communicating with other antenna stations in the array;

communicating with a central signal processor and display system, either by wire or wireless connection;

transmitting and receiving radar signals on a broad range of frequencies for detecting minefield arrays; and locating its position on the earth and with respect to other antenna stations in the array, using for example, a global positioning system receiver and processor.

A central signal processor may control radar transmissions from each station to sweep the transmitted frequencies, for example, and to process radar signals received by each station. A display unit may be used for manual spectral and temporal analysis of the processed signals to assist in correlating the unique characteristics of the signals to the location of minefields, number of mines, and the size of the minefield.

With appropriate phase relations established between each station, the stations function as a single radar accomplishing ranging and direction finding, and can choose the direction in which each is oriented, given directional receive antennas. This is achievable if at least the results of appropriate signal processing are made available at each station. Next, the benefits of using a surface wave radar configuration are discussed.

Electromagnetic energy is attenuated severely in most types of soil. For example, discussions in the literature of ground penetrating radar indicate a useful detection or imaging range of only a few feet. Customarily, plane, spherical or cylindrical wave types are used in these applications to penetrate fully into the soil.

To counter this limitation, a preferred embodiment of the present invention employs travelling surface waves that "hug" the air-ground interface. These waves travel along the interface and penetrate the soil just enough to illuminate buried landmines.

To accomplish this, the plane wave travelling along the air-ground interface is tapered in amplitude profile, having its maximum value at the interface, and tapering off in both directions therefrom. These surface waves are generated by HF power sources radiating through surface-wave antennas. See for example F. J. Zucker, "Surface-Wave Antennas," Chapter 12 of *Antenna Engineering Handbook*, edited by R. C. Johnson, $3^{rd}$ Edition, McGraw-Hill, 1993.

Since water-covered soil represents a quasi-worst case for field attenuation, assume that transmission is along a water surface. This yields conservative estimates of the maximum standoff range possible for minefield detection.

Ronald P. King relates that ships at sea have reliably communicated with shore stations, using surface waves, at distances up to 10,000 Km, using an antenna at or above the water's surface. See King, R. P., "Electromagnetic Ground-Wave Field Of Vertical Antennas For Communication At 1 To 30 MHz," *IEEE Transactions on Electromagnetic Compatibility*, Vol. 40, No. 4, November 1998, pp. 337–342. For an antenna operating below the surface, the range is much less. Although both above and below surface antennas are of interest, the following discussion is restricted to operation using only the above-surface antennas. The following discussion is based on the performance of a Canadian ground-wave (surface-wave) radar that became operational in the fall of 1990 and has had some enhancements added since then. See Hickey, K. J., et al., "Measurement of Ocean Surface Currents Using a Long-Range, High-Frequency Ground Wave Radar," *IEEE Trans. Oceanic Eng.*, 19, No. 4, pp. 549–554, October 1994; Hickey, K. J., et. al., "Parametric Estimation of Ocean Surface Currents with HF Radar," *IEEE Trans. Oceanic Eng.*, 20, No.2, pp. 139–144, April 1995; and Khan, R., et al., "Target Detection and Tracking with a High Frequency Ground Wave Radar," *IEEE Trans. Oceanic Eng.*, 19, No.4, pp. 540–548, October 1994.

The Northern Radar's Cape Race Ground Wave Radar (GWR) is an over-the-horizon surface-wave radar, designed to operate in the HF (3–30 MHz) band. The surface waves it emits travels hundreds of kilometers, following the curvature of the earth along the air-ocean interface and provides surveillance of over 160,000 Km² (Kahn 1994). While operating at 6.75 MHz to measure ocean surface current conditions the radar range was consistently greater than 200 Km during low noise conditions, and on one occasion beyond 300 Km, i.e., a 600 Km round trip. (Hickey 1994)

For use in a preferred embodiment of the present invention, the power requirements for each surface wave radar station, for all but the radar functions, is about 100 W. Each station weighs about 100 lb. To avoid ambiguities in direction finding, the stations are positioned to form a non-uniform antenna array, i.e., a non-uniform "phased array" coplanar with the earth's surface. For simplicity, a linear array geometry is assumed given the limited dimensions of any array as compared to the curvature of the earth. However, a curved array may be assumed in an alternative comparison.

The classical Bragg Effect occurs when the mathematical relationship of the geometric spacing, L, wavelength, λ, and the angle, θ, between the direction in which the impinging plane electromagnetic wave is travelling and the normal to the surface (in a preferred embodiment of the present invention the leading edge of one side of a rectangular array of mines) is:

$$2L \sin(\theta) = n\lambda \quad (1)$$

where n is an integer corresponding to a maxima in the reflected electromagnetic wave spectrum as a function of the swept frequency corresponding to the "Bragg Frequency." Sweeping the transmitted frequency rotates the focus of the signal transmitted from the "phased array" of ground transceivers.

The discussion by Ma (1993) can be adapted to the case where the medium within which the antenna array is embedded is lossy. For a minefield array of N columns by M rows of mines, the antenna array pattern in the plane of the minefield array is represented mathematically as:

$$S(\theta) = S_x(\theta) S_y(\theta) \quad (2)$$

This mathematical relationship can be represented in the form:

$$S_x(\theta) = \frac{\sinh\left(\frac{MU}{2}\right)}{\sinh\left(\frac{U}{2}\right)} \quad (3)$$

and $$S_y(\theta) = \frac{\sinh\left(\frac{NU}{2}\right)}{\sinh\left(\frac{U}{2}\right)} \quad (4)$$

where N is the number of landmines along each row parallel to the x-axis and M is the number of landmines along each column parallel to the y-axis. Further, $$U = kL \sin(\theta) \quad (5)$$

where the wave number $$k = \frac{2\pi}{\lambda}$$

The performance of the array can be characterized by the equivalent of a two-dimensional radar range equation:

$$P \approx \frac{P_O G(\theta) e^{-\Delta} e^{(-4\alpha d)} I^2(\theta) S^2(\theta)}{d} \quad (6)$$

where: the performance, P, of the radar array is a representative of a maximum working distance between the minefield and the radar "phased array" for an acceptable probability of detecting the minefield; $P_o$ is the initial transmitted power from the radar "phased array;" $G(\theta)$ is the gain of the "phased array" at the angle θ, $e^{-\Delta}$ is the effective attenuation due to imperfections in the minefield array analogous to the Debye-Waller factor in the x-ray diffraction theory for crystalline materials; $e^{-4\alpha d}$ is a factor accounting for the round trip attenuation of the signal; α is the attenuation constant for the soil; d is the distance to the center of the minefield array; $I(\theta)$ is the reflection pattern for an individual landmine; and $S(\theta)$ is the effective minefield array pattern factor in the direction θ corresponding to the passive amplification associated with the Bragg Effect. The equivalent of the Debye-Waller factor in the above relationship accommodates the effect of deviations in the spatial arrangement of the landmines from the assumed perfect rectangular array.

Electromagnetic waves reflected by the minefield are detected by the radar "phased array" transceiver in its receive mode. Detected signals are processed and displayed in a standard manner that outputs signal strength as a function of both frequency and time.

One potential problem for a surface wave radar is the presence of rocks, shrubs and topographic variations between and within both the "phased array" and the minefield. However the effectiveness of the surface wave "phased array" is not degraded by reflections of varying heights because the individual transceivers do not "see" objects of small dimension (i.e., in height) compared to the wavelength of the illuminating system. At the operating carrier frequency of 6.75 MHz, for example, the wavelength is about 45.4 meters.

The radar range equation used for describing performance of conventional radar provides only a rough estimate of the maximum useful range of a given radar based on transmitted power, antenna configuration, and assumed operating environment. An alternate way to estimate maximum operating range is by scaling to the known or observed performance of a comparable radar. Comparing the bi-static GWR described above to the mono-static operation of a preferred embodiment of the present invention provides one such estimate. However, a "best" comparison can not be made because key information such as antenna gain of the receiving antenna is not available from the references cited. Assume: frequency sweeping indicates Bragg reflection from the desired target occurs at an operating frequency of 6.75 MHz; the high gain of the bi-static receiving antenna array of the GWR combined with the low gain of its transmitting array is equivalent to the gain of the "phased array" of a preferred embodiment of the present invention; comparable receiver sensitivity, required signal-to-noise ratio and propagation attenuation; and that ten representative ground stations comprising the "phased array" of a preferred embodiment of the present invention each transmit a peak power of 100 watts for a total of 1 kW on a 1% duty cycle that is assumed equivalent to 100 watts on a 10% duty cycle of the GWR system. By thus forming equal ratios of transmitted powers, maximum ranges and receiver sensitivity, a maximum standoff distance of 2–3 Km is obtained, where the standoff distance is defined as the distance between the leading edge of the minefield and roughly the center of the "phased array." These estimated maximum ranges are predicated on very conservative numbers used to describe performance of solid state transmitters three decades ago. Less conservative figures suggest an order of magnitude greater stand-off-distances of 20–30 Km under ideal circumstances.

The abstract is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims, 37 CFR § 1.72(b). Any advantages and benefits described may not apply to all embodiments of the invention.

We claim:

1. A system that exploits the Bragg Effect to identify at least one pattern within at least one pre-specified geographic area, comprising:
    an array of transceiver stations, each said station having at least one antenna,
    wherein said array is remotely located from said pre-specified geographic area;
        at least one processor in operable communication with said array; and
        at least one display in operable communication with at least said processor,
    wherein each said transceiver station illuminates at least one said pre-specified geographic area with electromagnetic energy at a carrier frequency that may generate a Bragg resonance as a result of said carrier frequency being swept in frequency over a pre-specified band within a pre-specified time interval, and
    wherein if an orderly array of objects populate said pre-specified geographic area, said at least one transceiver station receives at least one reflection of electromagnetic energy from at least one object in said orderly array of objects that is coherent with a reflection of energy received from other objects in said orderly array of objects reflecting energy at said carrier frequency that generates a Bragg resonance.

2. The system of claim 1 in which said array of transceiver stations operates as one phased array system,
    wherein said transceiver stations are placed to configure said array asymmetrically.

3. The system of claim 2 in which at least one said at least one processor is co-located with at least one said transceiver station,
    wherein said at least one processor comprises at least one Global Positioning System (GPS) receiver that permits said at least one transceiver station to establish its position.

4. The system of claim 1 in which said pattern at least infers an ordered array of objects that is configured in a manner analogous to that of a minefield.

5. The system of claim 2 in which at least one of said transceiver stations employs at least said at least one antenna proximate a surface of the earth,
    wherein said at least one transceiver station transmits said electromagnetic energy at RF carrier frequencies as a surface wave.

6. The system of claim 5 wherein said RF carrier frequencies lie in the band from 3 MHz–30 MHz,
    wherein said electromagnetic energy is swept across at least a portion of said band at least once in a pre-specified time interval consonant with the capacity of said at least one processor.

7. The system of claim 3 in which said at least one antenna comprises:
    at least one first surface wave antenna configured to operate at least partially in free space; and
    at least one second antenna,
    wherein said at least one second antenna facilitates operable communication with systems external to said transceiver station.

8. The system of claim 7 in which said at least one second antenna comprises at least one antenna selected from the group consisting essentially of: a GPS antenna in operable communication with said GPS receiver, an antenna for operable communication with other said transceiver stations, an antenna for operable communication with a central processor, a satellite uplink antenna, and any combinations thereof.

9. A system that exploits the Bragg Effect to detect at least one pattern within at least one geographic area of interest, comprising:
    at least one transceiver having at least one antenna,
    wherein said transceiver is operated remotely from said geographic area of interest;
        at least one processor in operable communication with said transceiver; and
        at least one display in operable communication with at least said processor,
    wherein said at least one transceiver illuminates said at least one pre-specified geographic area with electromagnetic energy at a carrier frequency that may generate a Bragg resonance from an orderly array as a result of said carrier frequency being swept in frequency over a pre-specified band within a pre-specified time interval, and
    wherein if an orderly array of objects populates said pre-specified geographic area, said at least one transceiver receives at least one reflection of electromagnetic energy from each of more than one objects in said orderly array of objects that is coherent with a reflection of energy received from other said more than one objects reflecting energy at said carrier frequency that generates a Bragg resonance.

10. The system of claim 9 in which said at least one transceiver comprises:
    at least one radar system incorporating at least one phased array antenna; and
    at least one communications sub-system.

11. A method that exploits the Bragg Effect to detect a pattern having inherent parameters, said pattern being distributed within a pre-specified geographic area, comprising:
illuminating said pre-specified geographic area with electromagnetic energy having a carrier frequency,
wherein said carrier frequency is swept in frequency over a pre-specified band within a pre-specified time interval to generate Bragg resonance from an orderly array of objects that may be present in said pre-specified geographic area;
receiving at least one reflection of said electromagnetic energy from at least one object,
wherein if an orderly array of objects populates said pre-specified geographic area, at least one reflection of electromagnetic energy from each of more than one objects in said orderly array of objects is coherent with a reflection of energy received from other said more than one objects reflecting energy at said carrier frequency that generates a Bragg resonance;
processing said at least one reflection of said electromagnetic energy,
wherein said processing yields at least one pre-specified characteristic of said at least one reflection of said electromagnetic energy; and
displaying said at least one pre-specified characteristic,
wherein said displayed at least one pre-specified characteristic is used to detect the occurrence of said pattern.

12. The method of claim 11 in which said at least one pre-specified characteristic is selected from the group consisting of:
very weak reflected energy at some of said scanned frequencies and very strong reflected energy at others of said scanned frequencies;
at said Bragg resonance frequency, the relative amplitude of said reflected energy being very large when compared to said reflected energy not occurring at said Bragg resonance frequency;
said very weak reflected energy being distributed over a relatively large frequency band in comparison to said strong reflected energy;
said strong reflected energy occurring at the tops of very narrow high peaks in amplitude of said reflected energy;
a relatively large number of said narrow high peaks in amplitude of the reflected energy indicating said Bragg resonance frequency;
reflected energy having a very narrow beamwidth indicating said Bragg resonance frequency;
a very large spatial width of the beam of said reflected energy indicating said Bragg resonant frequency;
the orientation of the reflected energy having said very narrow beamwidth indicating said resonance frequency changes as said carrier frequency is swept, as sensed by said transceiver antenna array;
the rotation rate of the surface of reflected energy descriptive of a frequency at the Bragg resonance being controlled by the rate at which the frequency is swept; and
the peak values of reflected energy are spatially coherent.

13. The method of claim 12 in which at least 3 pre-specified characteristics are correlated to detect the presence of at least one said pattern.

14. The method of claim 13 further in which the occurrence of at least one of said pre-specified characteristics is used to determine at least one additional said inherent parameter, said inherent parameters selected from the group consisting of: the size of an orderly array of objects that may comprise said pattern, the perimeter of said orderly array of objects, the relative location of individual objects within said orderly array of objects, the number of objects within said orderly array of objects, and combinations thereof.

15. The method of claim 11 further comprising locating said detected pattern by utilizing signals from a global positioning system (GPS).

16. A method that exploits the Bragg Effect to identify a pattern having inherent parameters, said pattern being distributed within a pre-specified geographic area, comprising:
illuminating said pre-specified geographic area with electromagnetic energy having a carrier frequency,
wherein said carrier frequency is swept in frequency over a pre-specified band within a pre-specified time interval;
receiving at least one reflection of said electromagnetic energy from at least one object within said pre-specified geographic area;
processing said at least one reflection of said electromagnetic energy,
wherein said processing yields at least one pre-specified characteristic of said at least one reflection of said electromagnetic energy; and
displaying said at least one pre-specified characteristic;
wherein said displayed at least one pre-specified characteristic is used to identify said pattern.

17. The method of claim 16 in which said at least one pre-specified characteristic is selected from the group consisting of:
very weak reflected energy at some of said scanned frequencies and very strong reflected energy at others of said scanned frequencies;
at said Bragg resonance frequency, the relative amplitude of said reflected energy being very large when compared to said reflected energy not occurring at said Bragg resonance frequency;
said very weak reflected energy being distributed over a relatively large frequency band in comparison to said strong reflected energy;
said strong reflected energy occurring at the tops of very narrow high peaks in amplitude of said reflected energy;
a relatively large number of said narrow high peaks in amplitude of the reflected energy indicating said Bragg resonance frequency;
reflected energy having a very narrow beamwidth indicating said Bragg resonance frequency;
a very large spatial width of the beam of said reflected energy indicating said Bragg resonant frequency;
the orientation of the reflected energy having said very narrow beamwidth indicating said resonance frequency changes as said carrier frequency is swept, as sensed by said transceiver antenna array;
the rotation rate of the surface of reflected energy descriptive of a frequency at the Bragg resonance being controlled by the rate at which the frequency is swept; and
the peak values of reflected energy are spatially coherent.

18. The method of claim 17 in which at least 2 pre-specified characteristics are correlated to identify said at least one said pattern.

19. The method of claim 18 further in which the occurrence of at least one of said pre-specified characteristics is used to determine at least one additional said inherent parameter, said inherent parameters selected from the group consisting of: the size of an orderly array of objects that may comprise said pattern, the perimeter of said orderly array of objects, the relative location of individual objects within said orderly array of objects, the number of objects within said orderly array of objects, and combinations thereof.

20. The method of claim 16 further comprising locating said identified pattern by utilizing signals from a global positioning system (GPS).

21. A method that exploits the Bragg Effect to detect a pattern having inherent parameters, said pattern occurring within a pre-specified geographic area, comprising:

illuminating said pre-specified geographic area with electromagnetic energy having at least one carrier frequency, wherein said carrier frequency is swept in frequency over a pre-specified band within a pre-specified time interval to stimulate a Bragg resonance from an array of elements arranged in at least part of said pattern;

receiving reflections of said electromagnetic energy from more than one said elements, wherein if said array populates said pre-specified geographic area, at least one reflection of electromagnetic energy from each of said elements being illuminated with said electromagnetic energy is coherent with reflections received from other illuminated said elements at any said swept carrier frequency that generates a Bragg resonance;

processing said reflections, wherein said processing yields at least one pre-specified characteristic of said reflections, and wherein said processing includes correlating at least three said pre-specified characteristics to detect said pattern, said pre-specified characteristics selected from the group consisting of:

very weak reflected energy at some of said scanned frequencies and very strong reflected energy at others of said scanned frequencies;

at said Bragg resonance frequency, the relative amplitude of said reflections being very large when compared to said reflections not occurring at said Bragg resonance frequency;

said very weak reflections being distributed over a relatively large frequency band in comparison to said strong reflections;

said strong reflections occurring at the tops of very narrow high peaks in amplitude of said reflections;

a relatively large number of said narrow high peaks indicating said Bragg resonance frequency;

reflections having a very narrow beamwidth indicating said Bragg resonance frequency;

the beam of said reflections having a very large spatial width, thus indicating said Bragg resonant frequency;

the orientation of the reflected energy having said very narrow beamwidth indicating said resonance frequency changes as said carrier frequency is swept, as sensed by said transceiver antenna array;

the rotation rate of the surface of reflected energy descriptive of a frequency at the Bragg resonance being controlled by the rate at which the frequency is swept; and the peak values of reflected energy being spatially coherent; and displaying said characteristics, wherein said displayed characteristics facilitate detection of any said patterns.

22. The method of claim 21 using the occurrence of at least one of said pre-specified characteristics to determine at least one additional said inherent parameter, said inherent parameters selected from the group consisting of: the size of an array that may comprise said pattern, the perimeter of said array, the relative location of individual elements within said array, the number of elements within said array, and combinations thereof.

23. The method of claim 22 correlating at least two pre-specified characteristics to determine said inherent parameters.

24. The method of claim 23 further comprising precisely locating individual said elements by utilizing signals from a global positioning system (GPS).

* * * * *